3,037,024
DERIVATIVES OF PIPERAZINE
Robert F. Parcell, St. Clair Shores, Mich., assignor to Parke, Davis & Company, Detroit, Mich., a corporation of Michigan
No Drawing. Filed Apr. 17, 1958, Ser. No. 729,070
7 Claims. (Cl. 260—268)

This invention relates to substituted piperazines and to methods for obtaining the same. More particularly, the invention relates to substituted 1-phenalkyl-4-phenylpiperazines and acid addition salts thereof. The compounds of the invention in their free base form have the formula

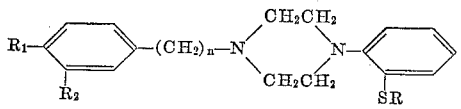

where $n$ is an integer from 2 to 4 inclusive, R is a two- or three-carbon aliphatic group, i.e., an ethyl, propyl, isopropyl or allyl group, and $R_1$ and $R_2$ each represent hydrogen or a lower alkoxy group, i.e., containing not more than three carbon atoms, but where in no case do both $R_1$ and $R_2$ represent hydrogen.

The compounds of the invention can be produced in a number of ways. One general method for producing these compounds involves reducing a substituted 1-phenylacyl-4-phenylpiperazine of the formula

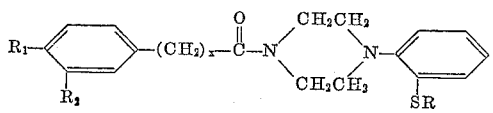

with a complex oxidizable metal hydride such as lithium aluminum hydride in an anhydrous non-hydroxylic organic solvent and decomposing the resulting reaction product with water; where R, $R_1$ and $R_2$ have the aforementioned significance and $x$ is an integer from 1 to 3. The reaction is preferably carried out in dilute solution employing an excess of the theoretically required amount of the hydride. Some examples of the many suitable solvents are diethyl ether, di-isopropyl ether, di-butyl ether, dioxane, tetrahydrofurane, ethylene glycol dimethyl ether and ethylene glycol diethyl ether. The temperature during the reduction is not particularly critical, a convenient range being from room temperature to the reflux temperature of the reaction mixture. The substituted-phenylacyl starting materials may be conveniently prepared by acylating the o-substituted phenylpiperazine with the required substituted phenylalkanoic acid, phenylacyl chloride or anhydride.

Alternately, the compounds of the invention may be produced by reacting a 1-phenylpiperazine of formula

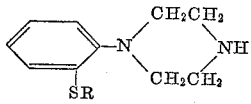

with a substituted phenylalkyl compound of formula

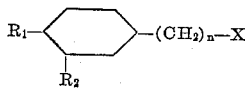

where X is a halide, sulfate or sulfonate and $n$, R, $R_1$ and $R_2$ have the aforementioned significance. For best results an equivalent or slight excess of the phenylalkyl halide, sulfate or sulfonate is employed. The reaction is conveniently carried out in an aqueous or anhydrous inert organic solvent. As examples of some of the many suitable solvents which may be used there may be mentioned low-boiling alcohols, ketones, ethers, hydrocarbons and the like. The reaction temperature is not critical, but for best results the process is carried out at the reflux temperature of the reaction mixture.

As indicated above, the compounds of the invention occur in both the free base and acid addition salt forms. In some instances it will be desirable to obtain the acid addition salt from the free base. The salt can be prepared by reacting the free base with the corresponding acid in the presence of a suitable organic solvent in which the resulting salt is insoluble, permitting isolation of the desired salt by filtration, decantation, etc. On the other hand in those instances where it is desired to convert the acid addition salt to the free base, the same can be accomplished by dissolving the acid salt in a suitable solvent such as water, methanol, etc., neutralizing the solution with a base such as sodium hydroxide, ammonium hydroxide, alkali metal carbonate and the like, and isolating the desired free base by extraction or other suitable means.

The compounds of the invention possess significant central nervous system depressant and hypotensive properties and hence have application in the treatment of hypertension and anxiety states. The compounds are particularly outstanding for their effectiveness by the oral route. For this purpose, the recommended dosage is of the order of 75 to 600 mg. per day.

The invention is illustrated by the following examples.

*Example 1*

A solution of 23.5 g. of 1-o-propylthiophenylpiperazine and 17.5 g. of p-methoxyphenylacetic acid in 100 ml. of xylene is refluxed with a water trap for 44 hours. The water is collected and approximately 50 ml. of xylene is removed by distillation. The solution is cooled, diluted with 200 ml. of ether and added to a stirred slurry of 5 g. of lithium aluminum hydride in 1 liter of ether. The reaction mixture is stirred and refluxed for 4½ hours and then decomposed by adding 5 ml. of water, 4 ml. of 20% sodium hydroxide and 18 ml. of water in that order. The solution is filtered and evaporated. The residual product, 1-p-methoxyphenethyl-4-o-propylthiophenylpiperazine, is converted to the monohydrochloride with an equivalent amount of isopropanolic hydrogen chloride. The monohydrochloride salt melts at 203–204° C. after recrystallization from isopropanol.

*Example 2*

A solution of 23.5 g. of 1-o-propylthiophenylpiperazine and 17.5 g. of m-methoxyphenylacetic acid in 150 ml. of xylene is refluxed with a water trap for 23 hours, the water being collected as described in Example 1. The reaction mixture is cooled and diluted with 200 ml. of ether and added to a stirred slurry of 5 g. of lithium aluminum hydride in 1 liter of ether. The reaction mixture is stirred and refluxed for four hours and then decomposed by adding 5 ml. of water, 4 ml. of 20% sodium hydroxide and 18 ml. of water. The solution is filtered and evaporated. The residual product, 1-m-methoxyphenethyl-4-o-propylthiophenylpiperazine, is converted to the monohydrochloride with isopropanolic hydrogen chloride; M.P. 164–166° C. after recrystallization from isopropanol and ether.

*Example 3*

A mixture of 48 g. of 1-o-propylthiophenylpiperazine, 25 g. of 4-(2-bromoethyl)-veratrole, and 500 ml. of toluene is stirred and refluxed for 16 hours, 400 ml. of toluene is removed distillation, and the residue is diluted to 1 liter with ether. The precipitated 1-o-propylthiophenylpiperazine hydrobromide is removed by filtration, and the filtrate evaporated on the steam bath. The residue of 1 - (3,4 - dimethoxyphenethyl)-4-o-propylthiophenylpiperazine is converted to the monohydrochloride with one equivalent of isopropanolic hydrogen chloride; M.P. 176–177° C. after recrystallization from a mixture of isopropanol and ether.

*Example 4*

A solution of 22 g. of 1-o-ethylthiophenylpiperazine and 21 g. of 3,4-dimethoxyphenylacetic acid in 150 ml. of xylene is refluxed for 21 hours, the water being collected in a trap. The reaction mixture is cooled and diluted with 200 ml. of ether and then added to a stirred slurry of 5 g. of lithium aluminum hydride in one liter of ether. The solution is stirred and refluxed for four hours and then decomposed by adding 5 ml. of water, 4 ml. of 20% sodium hydroxide solution and 18 ml. of water in that order. The solution is then filtered and evaporated. The residual product, 1-(3,4-dimethoxyphenethyl)-4-o-ethylthiophenylpiperazine, is converted to the monohydrochloride with an equivalent of isopropanolic hydrogen chloride; M.P. 193–194° C. after recrystallization from isopropanol and ether.

*Example 5*

A solution of 23.5 g. of 1-o-isopropylthiophenylpiperazine and 21 g. of 3,4-dimethoxyphenylacetic acid and 150 ml. of xylene is refluxed under a water trap for 21 hours. The solution is then cooled and diluted with 200 ml. of ether and added to a stirred slurry of 5 g. of lithium aluminum hydride in one liter of ether. The reaction mixture is stirred and refluxed for 4½ hours and then decomposed by adding 5 ml. of water, 4 ml. of 20% sodium hydroxide solution and 18 ml. of water in that order. The solution is filtered and evaporated and the residual product, 1-(3,4-dimethoxyphenethyl)-4-isopropylthiophenylpiperazine, is converted to the monohydrochloride with isopropanolic hydrogen chloride; M.P. 196–197° C. after recrystallization from isopropanol and ether.

*Example 6*

A solution of 23.5 g. of 1-o-allylthiophenylpiperazine and 21 g. of 3,4-dimethoxyphenylacetic acid in 100 ml. of xylene is refluxed under a water trap for 23 hours. 50 ml. of xylene is removed by distillation and the residual solution is cooled and diluted with 200 ml. of ether. This ethereal solution is added to a stirred slurry of 5 g. of lithium aluminum hydride in one liter of ether. The reaction mixture is stirred and refluxed for 4 hours and then decomposed by adding 5 ml. of water, 4 ml. of 20% sodium hydroxide solution and 18 ml. of water in that order. The solution is filtered and evaporated. The residual product, 1-(3,4-dimethoxyphenethyl)-4-o-allylthiophenylpiperazine, is converted to the monohydrochloride with isopropanolic hydrogen chloride; M.P. 159–161° C. after recrystallization from isopropanol and ether.

*Example 7*

A mixture of 23.6 g. of o-propylthiophenylpiperazine and 20 g. of 3,4-dimethoxyphenylacetic acid in 100 ml. of xylene is refluxed for 18 hours with the water being collected. The reaction mixture is cooled and slowly added to a stirred slurry of 6 g. of lithium aluminum hydride and 500 ml. of ether. The reaction mixture is stirred and then decomposed with water, sodium hydroxide solution and water in the manner described in the above examples. The solution is filtered and evaporated. The residual product, 1-(3,4-dimethoxyphenethyl)-4-o-propylthiophenylpiperazine, is converted to the monohydrochloride with isopropanolic hydrogen chloride; M.P. 176–177° C. after recrystallization from a mixture of isopropanol and ether.

*Example 8*

A solution of 29 g. of 3,4-dimethoxyphenylbutyric acid and 28 g. of 1-o-propylthiophenylpiperazine in 150 ml. of xylene is refluxed with a water trap for 16 hours until the theoretical amount of water is obtained (2.2 ml.). About 100 ml. of xylene is removed by distillation and the residual solution is diluted with about 400 ml. of ether. The ethereal solution is added to a stirred slurry of 6 g. of lithium aluminum hydride in about 1½ liters of ether. The reaction mixture is stirred under reflux temperatures for 5 hours and then allowed to cool. The reaction mixture is decomposed by the addition of 6.5 ml. of water, 5 ml. of 20% sodium hydroxide and 22.5 ml. of water added in that order. The solution is filtered and evaporated. The residual product, 1-(3,4-dimethoxyphenylbutyl)-4-o-propylthiophenylpiperazine, is converted to the monohydrochloride with isopropanolic hydrogen chloride and removed by filtration; M.P. 124.5–126° C. after recrystallizatin from a mixture of isopropanol and ether.

I claim:

1. A compound of the class consisting of a free base and its acid addition salts, said free base having the formula

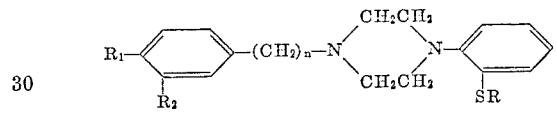

where $n$ is an integer from 2 to 4 inclusive, R is an aliphatic hydrocarbon group containing from two to three carbon atoms, and

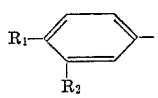

represents a member of the class consisting of 3-(lower alkoxy)phenyl, 4-(lower alkoxy)phenyl and 3,4-di(lower alkoxy)phenyl.

2. 1-p-methoxyphenethyl-4-o-propylthiophenylpiperazine.

3. 1-m-methoxyphenethyl-4-o-propylthiophenylpiperazine.

4. 1-(3,4-dimethoxyphenethyl)-4-o-ethylthiophenylpiperazine.

5. 1-(3,4-dimethoxyphenethyl)-4-o-allylthiophenylpiperazine.

6. 1-(3,4-dimethoxyphenethyl)-4-o-propylthiophenylpiperazine.

7. 1-(3,4-dimethoxyphenylbutyl)-4-o-propylthiophenylpiperazine.

References Cited in the file of this patent

UNITED STATES PATENTS 2,927,924    Mills _____ Mar. 8, 1960

FOREIGN PATENTS 765,989    Great Britain _____ Jan. 16, 1957

OTHER REFERENCES

Hampton et al.: Jour. Amer. Chem. Soc., vol. 59, pages 2570–2572 (1937).

Baltzly: Jour. Amer. Chem. Soc., vol. 66, pages 263–266 (1944).

Lowy et al.: An Introduction to Organic Chemistry, pages 215–216 (seventh edition).